United States Patent [19]

Chin et al.

[11] Patent Number: 4,714,865

[45] Date of Patent: Dec. 22, 1987

[54] OVERLOAD PROTECTION DEVICE

[75] Inventors: Laurence D. Chin, West Newton; Christopher J. Hiscock, Georgetown; Wayne H. Domeier, Boston, all of Mass.

[73] Assignee: Barry Wright Corporation, Newton Lower Falls, Mass.

[21] Appl. No.: 873,619

[22] Filed: Jun. 12, 1986

[51] Int. Cl.[4] ............................................. G05B 9/02
[52] U.S. Cl. ..................................... 318/563; 318/568; 901/2; 901/9; 901/46; 901/49
[58] Field of Search ........................ 318/568, 565, 563; 294/88; 901/27–29, 33–34, 37, 46, 48–49, 2, 9, 11; 364/513, 184–185, 188

[56] References Cited

U.S. PATENT DOCUMENTS

| 4,099,409 | 7/1978 | Edmond | 73/133 |
| 4,209,185 | 6/1980 | St. Clair et al. | 280/734 |
| 4,264,266 | 4/1981 | Trechsel | 414/730 |
| 4,540,331 | 9/1985 | Stanner et al. | 901/49 |
| 4,580,941 | 4/1986 | Inaba et al. | 414/730 |

OTHER PUBLICATIONS

Robotic Uni–Coupler Safety Joint, Robotic Accessories Division Process Equipment Company, 4191 US Route 40, Tipp City, Oh. 45371.
Sensoflex Overload Protection Device, Barry Wright Corporation, 700 Pleasant Street, Watertown, Mass. 02172.
Rumble Safety Mount, Rumble Equipment Limited, 25 Baywood Road, Rexdale (Toronto) Ontatio M9V 3Y8.
Uni–Coupler Safety Joint, Robotic Accessories, 4191 U.S. Route 40, Tipp City, Oh.
Safety Gun Mount, Alexander Binzel Corporation, 90 Noll Street, Waukegan, Ill. 60085.

Primary Examiner—William M. Shoop, Jr.
Assistant Examiner—David Martin
Attorney, Agent, or Firm—James W. Mitchell

[57] ABSTRACT

An overload protection device adapted to be secured between a robot arm and a tool, comprises a floating piston (20) within a cylinder (18). Hall effect sensors (124) are spaced around the cylinder wall and mating magnets (40) are spaced around the piston wall. The cylinder is pressurized to axially align the piston with the cylinder and to position each magnet in alignment with a sensor. When an overload occurs involving either the robot arm or the tool, the magnets are moved relative to the sensors causing the sensors to signal for depressurization of the cylinder. An electronic system (FIG. 27) responsive to the Hall effect sensor signals lights an "overload" LED D1 and triggers a timer circuit T1 which generates a timing pulse of fixed duration. During the duration of the timing pulse, the robot is de-energized. A red LED R is illuminated indicating the robot system is not ready to be operated. Also, a solenoid valve L1 is energized, cutting off the pressure to the cylinder.

18 Claims, 29 Drawing Figures

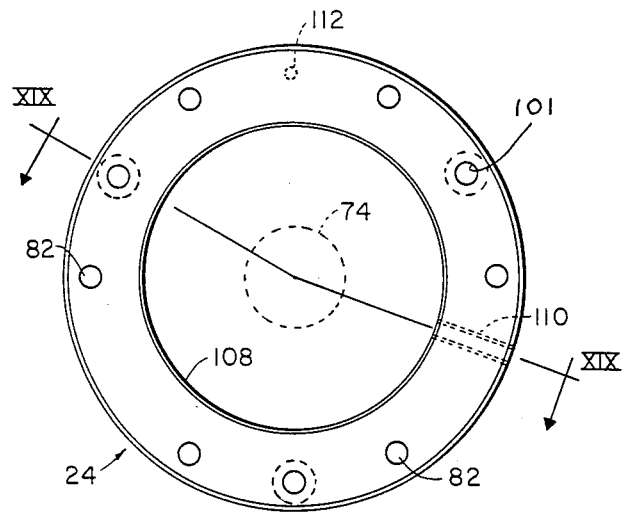
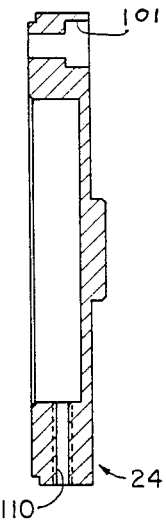
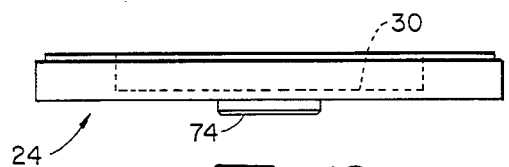
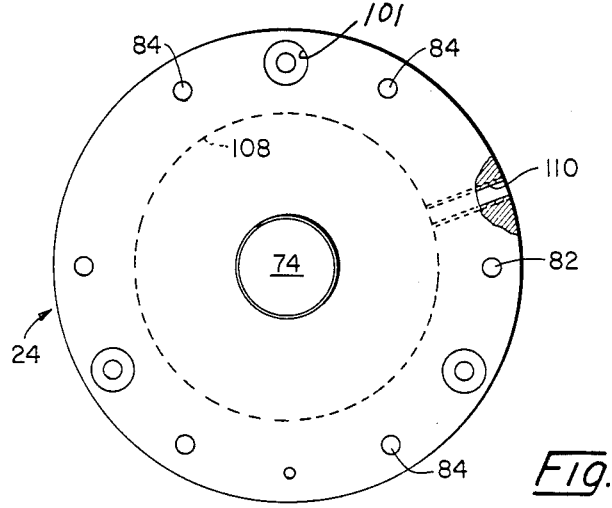

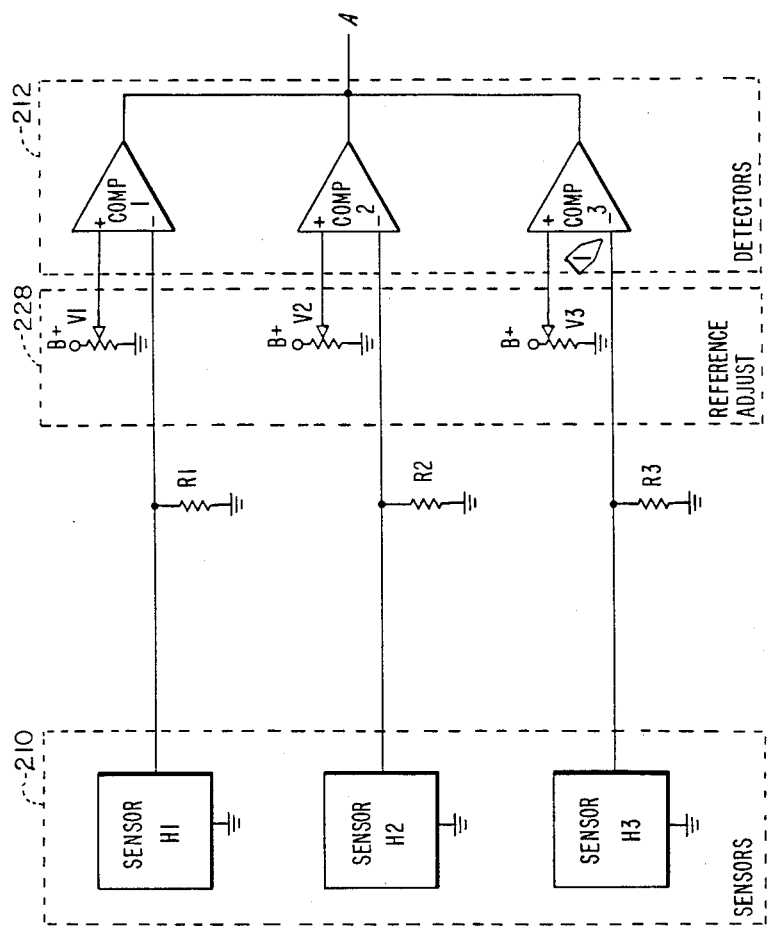
Fig. 27 SHEET 1 of 2

OVERLOAD PROTECTION DEVICE

FIELD OF THE INVENTION

This invention relates to overload protection devices and, more particularly, to devices designed to sense process disruptions which occur at the end of arm tooling in robotic automated machinery and interrupt the process.

BACKGROUND OF THE INVENTION

In the field of robotics a need has been recognized for mechanism which will automatically sense process disruptions as, for example, excessive forces and inadvertent physical contacts with the end of the arm tooling of robots and interrupt the process. It has likewise been determined that there is a need for protecting not only the robot but the tooling from damage if a disruption occurs in a process.

Many such devices have been developed. One such device is known as a "breakaway" joint. This type of joint is interposed between the tooling and the robot arm and physically breaks if an overload force greater than a predetermined amount is applied between the robot and the tooling. Such joints are difficult to replace and are not always reliable in protecting the robot and/or the tooling from damage. In most cases, such breakaway joints may only be used once and must be discarded and replaced with a new one.

Another type of protective device is known as a "snapaway" joint. When the robot or the tooling encounters a disruption, such as striking a misplaced part, the device actually snaps out of place displacing the tooling or allowing it to yield from contact with whatever it struck. For the most part, these devices embody releasable springs which yield when a predetermined load is placed upon them. Subsequently, they snap back after the disruption has been corrected. Many such devices use ball detent mechanisms. The range of such devices is limited by the strength of the springs employed, which is relatively low, and their ability to return to their original set position.

While the above described mechanisms are designed to unlock the rigid connection between the robot arm and its tooling, few, if any, are equipped to either shut down the process completely to prevent further spoilage of workpieces or to allow the robot to be reset with minimal downtime.

Consequently, a need exists for an overload protective device which will prevent or minimize damage to the workpiece or tooling upon the detection of a disruption and which will allow the process to be restarted in a minimal amount of time while retaining a high degree of tooling repeatability. Such a device should be adjustable to account for a wide range of loads and should be universally adaptable to tooling of various kinds.

SUMMARY OF THE INVENTION

The invention resides in an overload protection device adapted to be secured between a robot arm and a tool. In basic form, the device includes a cylinder and piston. The cylinder has a central axis, an open end, and a closed end. A floating piston, also having a central axis, is positioned within the cylinder. A plurality of Hall effect sensors are secured to the cylinder and lie in a common plane normal to the cylinder axis. They are equally spaced angularly relative to the cylinder axis. A magnet is associated with each sensor and is secured to the piston. The magnets are also disposed in a common plane normal to the piston axis. A flexible diaphragm is positioned between the piston and the closed end of the cylinder.

Means are provided for pressurizing the closed end of the cylinder to move the piston toward the open end where means are located to limit the motion and locate the common plane of the magnets coincident with the common plane of the sensors.

There are means responsive to the sensors for depressurizing the cylinder when the piston is moved toward the closed end of the cylinder. When this occurs, the common planes of the magnets and sensors move out of coincidence and the relative movement between at least one magnet and its associated sensor causes a signal to be generated by at least one of the Hall effect sensors.

The piston includes guide means extending parallel to its axis, which means are engaged by releasable, adjustable detents, which extend from the cylinder to the guide means. This assures that each magnet is aligned angularly with its associated sensor. The releasable detents also serve in resetting the piston and cylinder after a disruption has occurred and the cylinder has become depressurized.

When a rotational force causes the piston and cylinder to rotate relative to each other of a magnitude sufficient to overcome the force of the detents, the magnets and sensors experience relative motion and at least one of the sensors generates an overload signal to cause depressurization. Likewise, when a tilting motion occurs between the piston and the cylinder sufficient to overcome the predetermined pressure in the cylinder, the coincident axis of the piston and the cylinder will be displaced from each other and, again, there will be relative motion between at least one magnet and its associated sensor causing a signal to be generated by the sensor to trigger depressurization of the cylinder.

The cylinder is depressurized by energizing a solenoid valve which closes an input air valve to the cylinder and opens an exhaust channel to the piston chamber. This causes the diaphragm to become limp permitting a predetermined amount of compliance between the robot arm and the tool; thereby preventing further damage to the tool or workpiece.

The "overload" signal also illuminates an "overload" LED, and triggers a timing signal of fixed duration which de-energizes the robot and illuminates a "not-ready" LED, alerting the robot operator to a malfunction.

When the cause of the overload has been remedied, the overload protection device can be re-set by moving a switch to a re-set position which again turns off the robot and permits re-energization of the solenoid valve. This allows the diaphragm to re-inflate if the piston and the axes are re-aligned. The sensitivity of the overload protection device can then be adjusted. If conditions for operation are proper, when the switch is then moved to its ON position power is permitted to be applied to the robot. A ready light is then lit and normal conditions obtain.

The above and other features of the invention, including various and novel details of construction and combinations of parts, will now be more particularly described with reference to the accompanying drawings and pointed out in the claims. It will be understood that the particular overload protection device embodying the invention is shown by way of illustration only and as

3 a limitation of the invention. The principles and features of this invention may be employed in varied and numerous embodiments without departing from the scope of the invention.

BRIEF DESCRIPTION OF THE DRAWINGS

FIG. 19 is a side view of the valve enclosure of the overload protector.

FIG. 20 is a top plan view, thereof.

FIG. 21 is a bottom plan view, thereof.

FIG. 22 is a section taken along the lines XXII—XXII on FIG. 20.

DETAILED DESCRIPTION OF THE INVENTION

Figure 1:
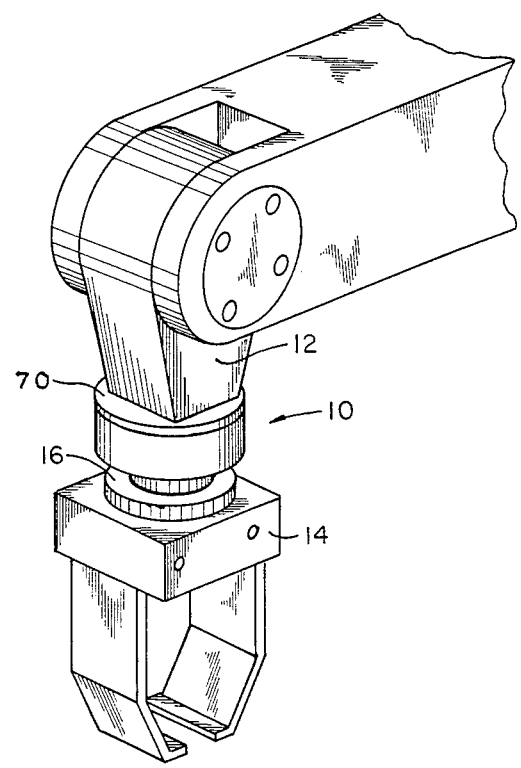
FIG. 1 is a perspective view of an overload protection device secured between a robot arm and a tool.

FIG. 1 discloses an overload protector 10 made in accordance with this invention secured between a robot arm 12 and a tool 14. A tool interface member 16 attaches the overload protector to the tool and a mounting plate 70 attaches the protector to the robot arm.

Figure 2:
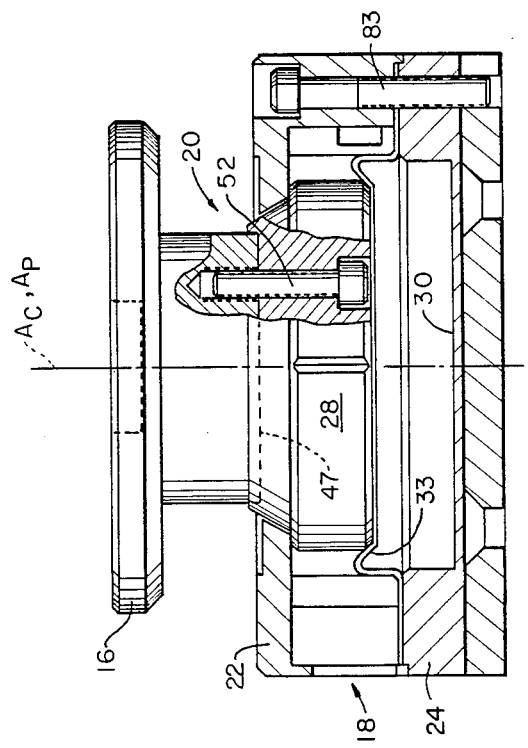
FIG. 2 is an elevational view partially in section and with parts broken away of the overload protection device.
Figure 3:
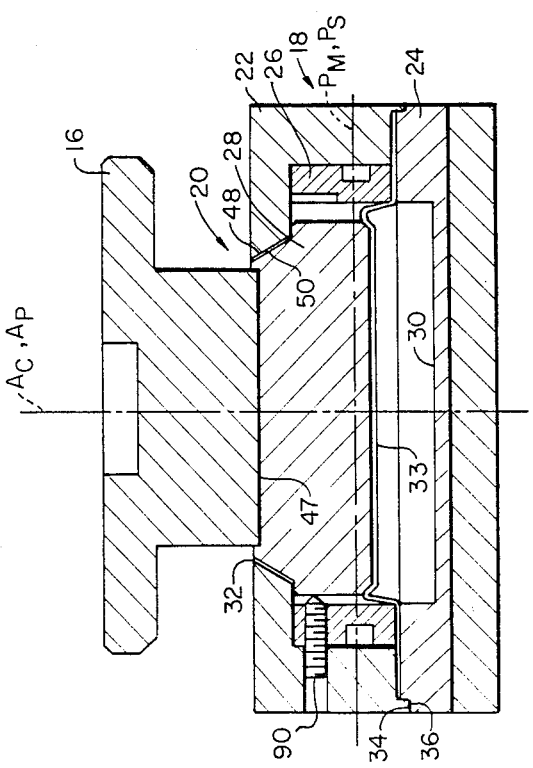
FIG. 3 is a sectional view in elevation of the overload protection device.
Figure 6:
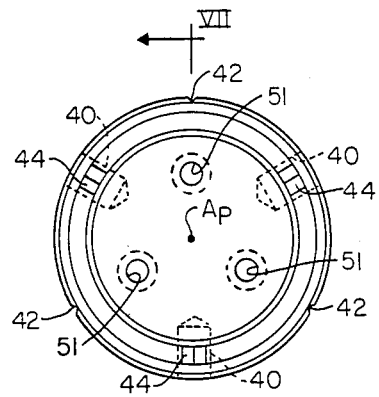
FIG. 6 is a top plan view, thereof.
Figure 4:
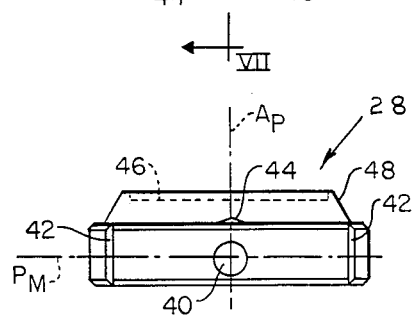
FIG. 4 is a side view of the main portion of the piston.
Figure 7:
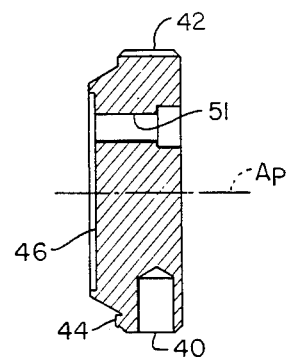
FIG. 7 is a sectional view taken along the line VII—VII on FIG. 6.
Figure 5:
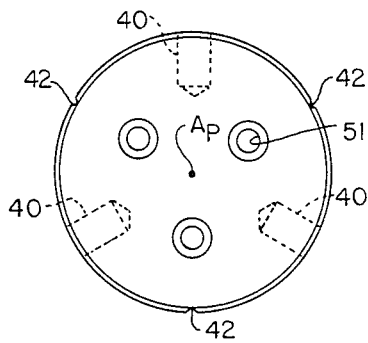
FIG. 5 is a bottom plan view, thereof.

Referring next to FIGS. 2 and 3, the overload protector 10 is shown in assembled form, but inverted with respect to the FIG. 1 showing, with the tool interface 16 projecting upwardly. The device, in its elemental form, comprises a cylinder 18 and a floating piston 20. The tool interface 16 is integral with the piston and projects out of the cylinder. The cylinder is made up of a number of components, including a top retaining cap 22, a valve enclosure 24, and a sensor ring 26.

The piston comprises a main piston body 28, also known as a diaphragm ring, and the tooling interface 16 which is secured to the main piston body 28, as seen in FIG. 2. The elements of the cylinder 18 are assembled around the piston, as will be explained in more detail hereinafter.

The cylinder has a central axis, $A_c$, a closed end 30 formed by the bottom of the valve enclosure 24, and a open end defined by a circular opening 32 in the top retaining cap 22. A Bellofram diaphragm 33 is located between the main piston body 20 and the closed end 30 of the cylinder. Upon assembly, the diaphragm is firmly clamped between the retaining cap 22 and the valve enclosure 24. An annular step 34 in the valve enclosure mates with a concentric annular flange 36 on the retaining cap 22 with the periphery of the diaphragm lying within, and not visible from, the outside of the cylinder.

The Piston

A. The Main Portion

Referring now to FIGS. 4 through 7, the piston will be described. The main portion 28 of the piston is engagable with the top of the Bellofram diaphragm 33 and is also, therefore, called the diaphragm ring. It is circular in configuration having a central axis $A_p$. A plurality of magnets 40 are located in the piston extending to its circumference. There are 3 magnets spaced 120 degrees equidistantly from each other, angularly, relative to the central axis $A_p$. The magnets lie in a common plane $P_m$ which is normal to the axis $A_p$. Formed in the circumference of the piston are guide means in the form of V-shaped grooves 42 which are parallel to the axis $A_p$ of the piston.

Upwardly projecting V-shaped detents 44 are formed on the piston in alignment above the magnets 40. A circular receiving well or recess 46 is formed in the upper surface of the piston to receive the lower cylindrical portion 47 of the tooling interface, as shown in FIGS. 2 and 3. The upper portion of the piston includes a conical surface 48 which mates with a similar conical surface 50 on the retaining cap 22 which will be explained in greater detail hereinafter. Three bolt holes 51 are formed in the piston to receive bolts 52 (FIG. 2) to secure it to the tooling interface 16.

B. The Tool Interface

Figure 9:
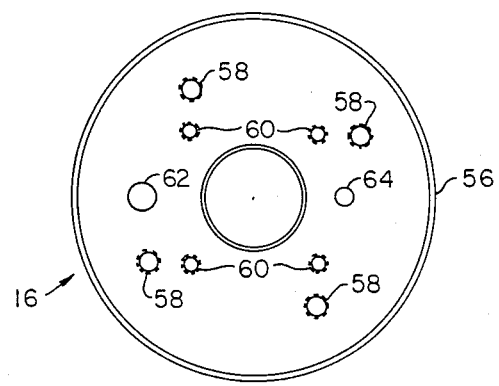
FIG. 9 is a top plan view, thereof.
Figure 8:
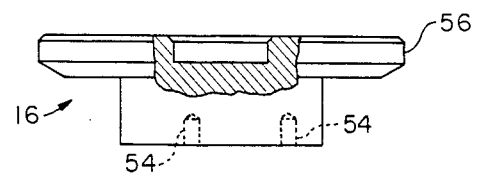
FIG. 8 is a side view, partially broken away, of the tooling interface of the overload protector.
Figure 10:
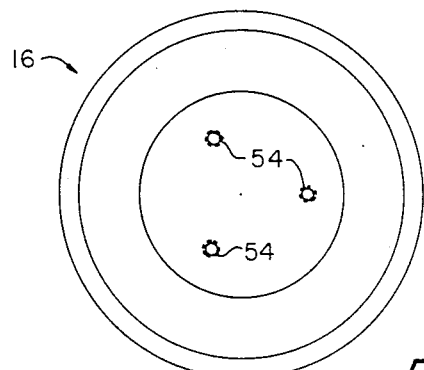
FIG. 10 is a bottom plan view, thereof.

The tool interface 16, which is joined to the piston 28, is shown in FIGS. 8, 9 and 10. It includes taped bolt holes 54 in its bottom surface for receiving the bolts 52. The upper portion of the tool interface includes a circular flange 56 having a first set of tapped holes 58 for securing the interface member 16 to a robot tool and a second set of tapped holes 60 for securing the interface to a tool of smaller size. Dowel pin holes 62 and 64 are formed in the flange to assist in the assembly of the interface and the tool.

The Mounting Plate

Figure 12:
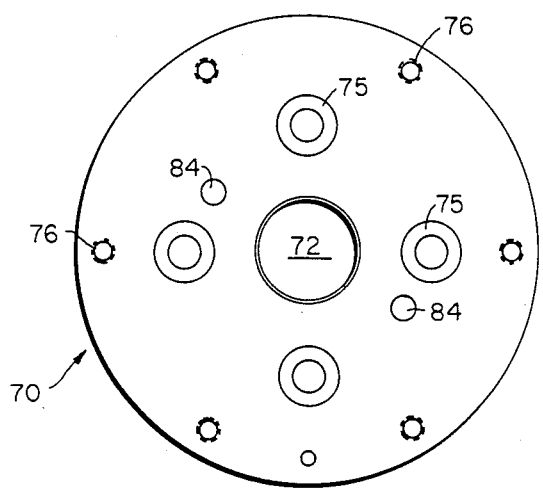
FIG. 12 is a top plan view, thereof.
Figure 11:
FIG. 11 is a side view, partially broken away, of a mounting plate for the overload protector.
Figure 18:
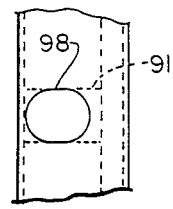
FIG. 18 is a detailed view taken in the direction of the arrow XVIII on FIG. 14.
Figure 14:
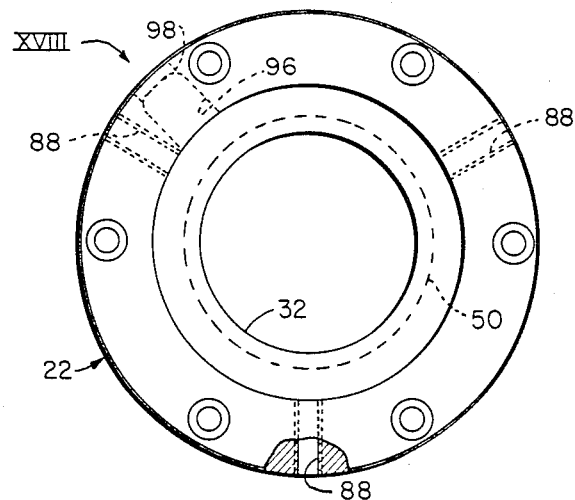
FIG. 14 is a top plan view, thereof.
Figure 16:
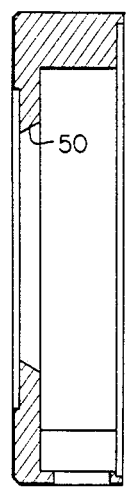
FIG. 16 is a section taken along the line XVI—XVI on FIG. 15.
Figure 13:
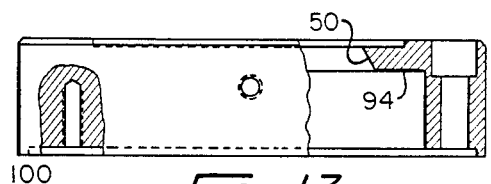
FIG. 13 is a side view, partially broken away and in section, of the retaining cap of the overload protector.
Figure 17:
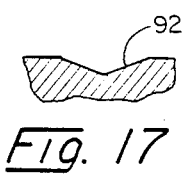
FIG. 17 is a detailed sectional view taken along the line XVII—XVII on FIG. 15.
Figure 15:
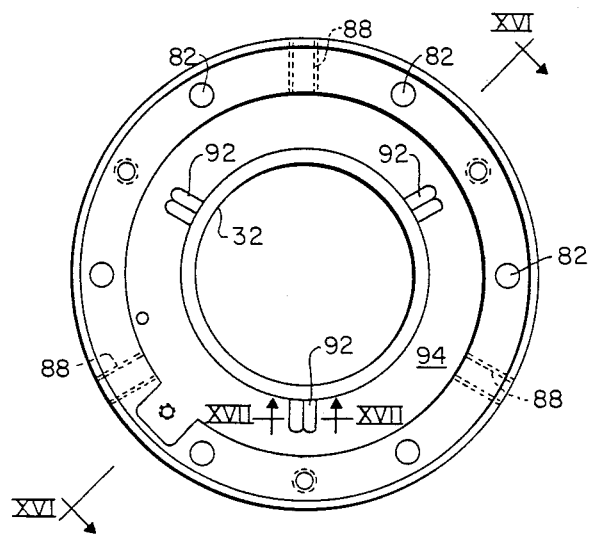
FIG. 15 is a bottom plan view, thereof.
Figure 24:
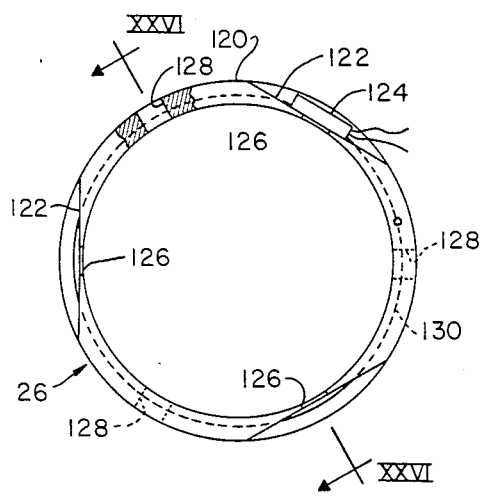
FIG. 24 is a top plan view, thereof.
Figure 26:
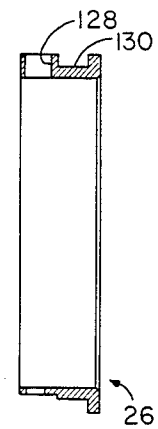
FIG. 26 is a section taken along the lines XXVI—XXVI on FIG. 24.
Figure 23:
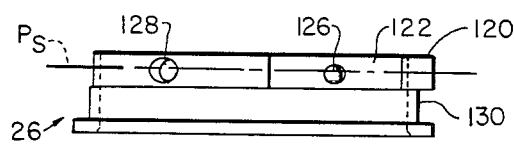
FIG. 23 is a side view of the sensor ring of the overload protector.
Figure 25:
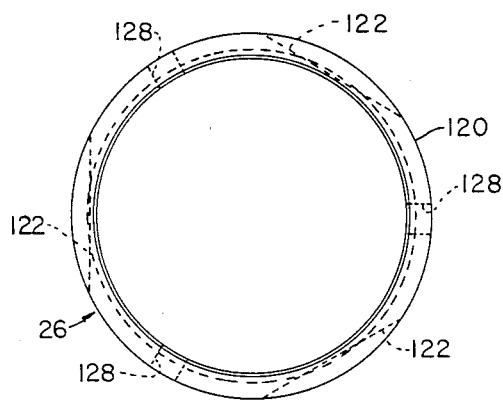
FIG. 25 is a bottom plan view, thereof.

A mounting plate 70 is employed for securing the overload protector to the robot arm and will be described with reference to FIGS. 11 and 12. It is a flat circular plate having a circular well 72 for receiving and locating a downwardly projecting cylindrical member 74 (FIG. 19) formed on the valve encloser 24. The plate 70 includes countersunk holes 75 for receiving bolts which thread into the robot arm and six tapped holes 76 for receiving bolts which pass through holes in the retaining cap and in the valve encloser. Dowel pin holes 84 are also included in the mounting plate 70 to assist in assembly.

The Cylinder Assembly

A. Retaining Cap

The retaining cap 22 defines the open end of the cylinder assembly and will be described with reference to FIGS. 13 to 18. It is generally cylindrical in cross section having a circular opening 32 through which the tooling interface portion 16 of the piston 20 projects. It includes the conical surface 50 which mates with the conical surface 48 on the main body 28 of the piston. The function of the conical surfaces 48 and 50 is to limit the amount of the travel of the piston in a direction away from the closed end and to align the common planes of the magnets with the common planes of the sensors. They also serve to align the axis $A_p$ of the piston with the axis $A_c$ of the cylinder.

Three bores 88 are formed equidistantly, 120°, from each other and in a common plane, in the retaining cap 22. Each receives a spring biased detent 90 (FIG. 3) in the form of an adjustable Vlier spring plunger which projects through the sensor ring 26 and engages the V-shaped grooves 42 in the piston 28. The function of the detents will be explained in greater detail hereinafter.

Three V-shaped indentations 92 are spaced 120° apart in a annular, horizontal surface 94 which is essentially the top of the cylinder. The V-shaped projections 44 on the piston 28 are engagable within the V-shaped indentations 92 in the cylinder and serve as aligning means for resetting the piston in the cylinder after a disruption occurs.

A chamber 96 (FIGS. 14 and 18) is formed in the cap 22 and communicates with an oval-shaped opening 98 in the wall of the cap. The electrical connectors to the overload protections device enter through the oval orifice 98 and strain relief means (not shown) are located in the chamber 96.

A plurality of tapped holes 100 are formed in the bottom of the cap to receive bolts projecting upwardly through counterbored holes 101 in the valve enclosure 24. On assembly, the diaphragm 33 is positioned between the cap 22 and the valve enclosure 24 (FIGS. 2 and 3) and its edges are clamped tightly by bolts passing through holes 102 in the valve enclosure 24 (see FIG. 21).

B. The Valve Encloser

The valve encloser 24 which forms the closed end of the cylinder 30 will next be described with reference to FIGS. 19 through 22. It includes a circular recess 108 which is the closed end 30 of the cylinder. It includes the circular projection 74 which is received in the well 72 in the mounting plate 70.

A passageway 110 is formed in the wall of the encloser, through which an appropriate valve fitting (not shown), admits pressurized air to and from the cylinder. THe encloser 24 also includes a dowel pin hole 112 to assist in assembly with the mounting plate 70. Six bolt clearance holes 84 mate with the six bolt clearance holes 82 in the retaining cap 22 and receive bolts 83 which are threaded into the mounting plate 70 (FIG. 2).

The Sensor Ring

The sensor ring 26 will now be described with reference to FIGS. 23 to 26. The principal purpose of the sensor ring 26 is to mount the Hall effect sensors and their wiring in relation to the magnets 40 in floating piston 20. The sensor comprises a circular ring 120 formed with three flats 122 equidistantly spaced 120° apart. A Hall effect sensor 124 is positioned on each flat, only one being shown in FIG. 24.

In the center of each flat 122, there is an opening 126 in front of the sensor 124 so that there will be no obstruction to the magnetic field between the sensor and its associated magnet (not shown in FIG. 24) but which is located on the piston in alignment with the sensor. Also formed in the sensor ring are three openings 128 through which the spring plungers 90 pass, as seen in FIG. 2. An annular channel 130 is formed around the ring to accommodate the wiring from the sensors.

The Piston-Cylinder Assembly

The overload protection device is assembled, as shown in FIGS. 2 and 3. The tooling interface portion 16 of the piston 20 is secured to the main body portion 28. The magnets 40 (see FIG. 6) are secured in the main body of the piston.

The cylinder is assembled initially without the mounting plate 70 by first positioning the piston within the retaining cap 22. The diaphragm 33 is next positioned beneath the piston with its perimeter between the retaining cap and the valve enclosure 24 forming an airtight seal. The valve enclosure and the retaining cap are then bolted together and the combination is then bolted onto the mounting plate.

Operation

With the tooling interface 16 secured to the tool 14 and the cylinder secured to the robot arm 12, as seen in FIG. 1, the tool and the arm are rotated relative to one another until the detents 90 (FIG. 2) engage the longitudinal grooves 42 (FIG. 6) in the piston. The cylinder is then pressurized causing the piston to move toward the open end of the cylinder until the detents 44 spaced around the top of the piston engage the depressions 92 in the retaining cap. The conical surface 48 on the piston engages the mating conical surface 50 on the retaining cap. This engagement serves to align the axis $A_p$ of the piston with the axis $A_c$ of the cylinder in coincidence and to limit the amount of movement of the piston in the direction towards the open end of the cylinder, or upwardly as viewed in FIGS. 2 and 3. The force by which the detents 90 engage the grooves 42 in the piston are adjusted to a predetermined amount which is the force by which the piston and the cylinder will have to rotate relative to each other upon the occurrence of a disruption to cause the magnets and sensors to move relative to each other.

The overload protector will respond to three general types of relative movement between the robot arm and its tool. Linear motion along the axis $A_p$ of the piston and $A_c$ of the cylinder, rotational motion about these axes, when they are coincident, and motion which is a rocking or tilting motion which would cause the axes to move out of coincidence results in a signal to be generated.

If a force resulting from a disruption is applied in a direction axially of the then coincident axis $A_p$ and $A_c$ of the piston and cylinder respectfully, which is sufficient to overcome the predetermined pressure within the cylinder, the piston and cylinder move relative to each other. The piston moves toward the closed end of the cylinder resulting in relative movement between one or more sensors and its associated magnet. At this time, the common planes $P_s$ and $P_m$ of the sensors and the magnets respectively, which were coincident, move apart. Again, the resulting movement of one of the magnets relative to its associated sensor, causes a signal to be generated by the sensor causing the cylinder to be depressurized and the diaphragm to become limp resulting in a compliant coupling existing between the robot and the tooling.

If a rotational movement takes place between the tool and the robot arm due to a disruption of a magnitude sufficient to overcome the force of the Vlier spring plungers urging the detents into the grooves of the piston, relative rotational motion will take place between the sensors and their associated magnets. Again, this results in depressurizing the cylinder. If a force, which is a combination of linear and rotational results in a tilting motion to move the coincident axes of the cylinder and piston out of coincidence, there will, again, be relative motion between one or more of the sensors and its associated magnet. Thus, as a result of any relative motion between a sensor and its magnet, there is a change in the magnetic field and the sensor is actuated.

Upon depressurization of the cylinder, the piston and cylinder may be returned to their operating state manually be re-engaging the detents with the guide slots in the piston and again pressurizing the cylinder.

The Electronic System

Figure 27:
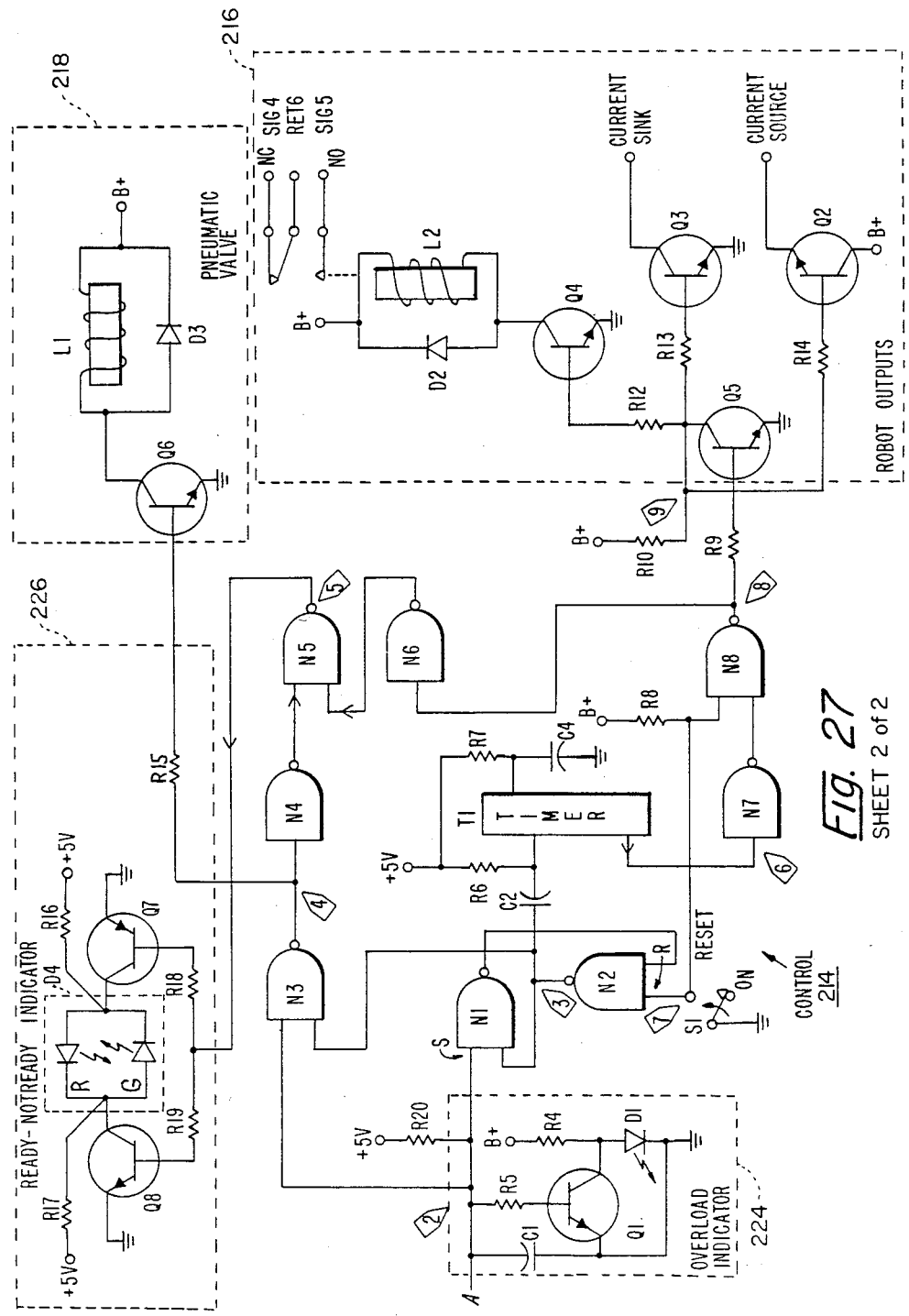
FIG. 27 is a schematic of the electronic system of the invention.

The overall circuit diagram of the electronic system of the invention is shown in FIG. 27. Major blocks of the apparatus of FIG. 27 are shown within dotted lines, and comprise a sensor circuit 210, a reference adjust circuit 228, a detector circuit 212, an overload indicator 224, a control circuit 214, a Ready-Not Ready indicator 226, a pneumatic valve circuit 218 and robot output circuitry 216.

The sensor circuit is made up of the three Hall effect sensors $H_1$, $H_2$, and $H_3$, previously mentioned in connection with the overload protection device. These sensors are located on a cylinder adjacent oppositely disposed magnets mounted on the piston of the overload protection device. Hall effect sensors H1, H2 and H3 generate a current signal, I1, I2 or I3, respectively, which causes a voltage to occur at the negative input lead of respective comparators 1, 2 or 3, located in detector circuit 212. The voltage applied to the comparators 1, 2 or 3 is dependent on the IR drop across fixed matched resistors R1, R2 or R3, respectively.

When the sensors H1, H2 and H3 are located in a null position, such that no overload condition exists, the voltage at the negative input leads to comparators 1, 2 and 3 will be substantially identical and will be at a predetermined level indicative of a null condition, such as, 6 volts positive. The voltage at the positive input lead to comparators 1, 2 and 3 is set by variable voltage resistors V1, V2 and V3, respectively, coupled between ground and a B+ power supply voltage of, for example, 12 volts DC.

Variable resistors V1, V2 and V3 provide a reference adjust circuit 228 whereby the sensitivity of the electronic circuitry of FIG. 27 can be adjusted so that very small changes in the relative position between any of sensors H1, H2 and H3 and their corresponding magnet, will produce a sufficient voltage difference between the plus and negative inputs to comparators 1, 2 and 3 to generate an output pulse from one of the output leads of comparators 1, 2 or 3 which are tied together and coupled to the Set input terminal of NAND Gate N1 in the control circuit 214.

An overload protection device logic diagram is provided below as Table 1 showing the logic states at various circuit locations numbered within a pointed box in FIG. 27 as a result of certain occurrences.

TABLE 1

| Event Description | OPD LOGIC DIAGRAM Logic Locations | | | | | | | | | | |
|---|---|---|---|---|---|---|---|---|---|---|---|
| | 1 | 2 | 3 | 4 | 5 | 6 | 7 | 8 | 9 | D4 | D1 |
| "ON" State | L | H | H | L | L | L | H | L | H | GRN | OFF |
| Overload | H̲ | L̲ | L̲ | H̲ | H̲ | H̲ | H̲ | H̲ | L̲ | Red̲ | ON̲ |
| Detected one sec. later | H | L | L | H | H | L̲ | H | L̲ | H̲ | Red | ON |
| "Reset" switch | H | L | L | H | H | L | L̲ | H̲ | L̲ | Red | ON |
| Manual reset | L̲ | H̲ | H̲ | L̲ | H | L | L | H | L | Red | OFF̲ |
| "ON" | L | H | H | L | L̲ | L | H̲ | L̲ | H̲ | GRN̲ | OFF |

Notes:
1 "_" below a letter indicates a change of state with that event.

Thus, when an overload condition is present, as shown in the logic diagram of Table 1 above, the following conditions exist with respect to the logic states at the negative inputs to comparators 1, 2 or 3. This point goes from a normal "ON" state of a Low voltage to a High (See logic location 1). When when this occurs, the logic state at logic location 2, i.e., the input to the Set(S) terminal of NAND Gate N1, changes from a High to a Low. This sets a flip-flop circuit comprising NAND Gates N1 and N2 resulting in the output of N2 (at logic location 3) going from a High to a Low. This Low is coupled to the second terminal of NAND Gate N1 and also to the second terminal of NAND Gate N3, the purpose of which will be described later.

The change in logic level from High to Low caused by the overload detection which occurs at the output of the comparators (logic location 2) is also coupled via filter capacitor C1 to the emitter of transistor Q1 causing Q1 to conduct from ground through LED D1 through the collector to the base of Q1 through bias resistors R5 and resistor R20 to a power supply voltage of 5 volts. Biasing resistor R4 is coupled to B+ and the collector of Q1 at the junction of the anode of LED D1. Thus, LED D1 is illuminated and stays illuminated as long as the output of any of the comparators is at a Low or, in other words, whenever the negative inputs to any of the comparators is at a High, indicating that an overload condition has occurred (See OPT Logic Diagram Table 1). The Low signal at logic location 2 is also coupled to NAND Gate N3 causing the output of NAND Gate 3 to go from a Low to a High (See logic location 4 in the Logic Diagram of Table 1). This High voltage signal is applied across resistor R15 and causes transistor Q6 to conduct thereby providing a current path from ground through the emitter of Q1 and coil L1 of a solenoid valve, which is connected to B+ and is coupled in parallel with unilateral diode D3. This causes a pneumatic valve to operate which cuts off the source of air to the overload protection device cylinder and opens the exhaust for the piston causing the diaphragm in the overload detection device to deflate thereby resulting in compliant coupling between the robot arm and the robot tool.

The output of NAND Gate 2 (logic location 3) is coupled through capacitor C2 to the input of a timer circuit T1. T1 is a programmable timer, such as an LM 555 chip. T1 includes a flip-flop circuit which is "Set"

when the signal at logic level point 3 goes from a High to a Low. Timer T1 produces a High pulse of fixed duration, i.e., one second, which is coupled to the input of NAND Gate 7 (logic location 6). This High at NAND Gate 7 is coupled to one input lead of NAND Gate 8 the other input of which is floating until grounded in the re-set position of S1. The output of NAND Gate 8 is also High at this point (logic Location 8), which causes grounded emitter transistor Q5 to start conducting. When Q5 conducts, then Q4, is also biased to conduct, energizing solenoid relay L2 coupled in parallel with unilateral conducting diode D2. Solenoid relay L2 moves relay switches as from the normally closed position NC to a normally open position NO; opening the robot load circuit turning the robot off for the one second duration of the timer pulse from T1. This alerts the robot operator to the existence of an overload condition.

Figure 28:
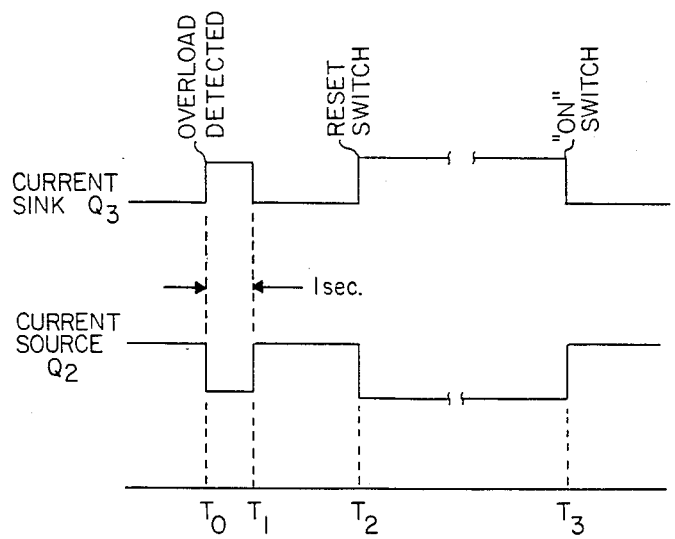
FIG. 28 is a waveform timing diagram illustrating the timing of certain functions in FIG. 27.

In an alternative configuration of the interface circuit to the robot, the robot load may be connected to ground via a current sink transistor Q3, the emitter of which is coupled to ground, or through a current source configuration of transistor Q2 in which the collector is coupled to B+. In normal operating conditions, Q2 would provide current source to energize the robot, whereas Q3 would provide a ground to maintain the robot energized. In either configuration, when Q5 conducts, because of the presence of a High from output of NAND Gate 8, (logic location 9) Q2 and the Q3 both stop conducting, thereby de-energizing the robot momentarily, as shown in FIG. 28 for the time interval $t_0-t_1$.

At the end of the one second interval, "one second later" Table 1, the input goes Low to NAND Gate 7 and the robot is re-energized. However, the robot operator has been notified by this 1 second de-energization that something is wrong with respect to the operation of the robot arm and that any obstruction should therefore be cleared.

When an obstruction is cleared, the reset switch S1 is moved from the On position, as shown, to the Reset Position. As may be seen in the Reset position, the reset input terminal to NAND Gate N2 is grounded causing the output state of NAND Gate 2 at logic location point 7 to go from a High to a Low. Similarly, by turning S1 from On to Reset, one of the input leads to NAND Gate N8 is also grounded causing the output of NAND Gate N8 at logic location 8 to go from a Low to a High, which in turn, causes the junction of R12, R13 and the base of Q5 to go from a High to a Low, thereby re-energizing the robot since Q3 then becomes conductive again and Q2 also becomes conductive again, whereas Q4 becomes non-conductive, de-energizing solenoid relay L2 causing the relay contacts to go to their normally closed position, as shown.

It should be noted that once an overload condition occurs, an indicator light in circuit 226 is illuminated. The Ready-Not Ready indicator lamp circuit 226 operation will now be described. A single LED D4 capable of emitting red or green light is utilized. For illustrative purposes LED D4 is shown as two diodes, a red LED R and a green LED G connected back-to-back between NPN transistor Q8 and PNP transistor Q7 suitably biased by resistors R17 and R16 coupled to +5 volts. When the output of NAND Gate N5 (location 5) goes from a Low to a High, the red diode R of D4 goes On indicating a Not Ready state and the green ready diode G goes Off. A High at the juncture of R19 and R18 biases Q7 "On" causing current to flow from ground through Q8 through LED R through Q7 to R16 and +5 volts. Whereas when the opposite condition obtains Q7 conducts enabling current to flow through Q7 and green diode G through R17 to +5 volts while Q8 is biased "Off".

Once the robot has been de-energized as above, the cause of the overload may be fixed while the diaphragm is deflated. Then, the overload protection device may be reset to its null position or non-overload initial state by switching S1 to the "RESET" position. In the "RESET" position of S1, the Re-Set input to N2 is grounded causing the input (logic location 7) to go LOW. The output does not change, however, until the other input terminal connected to the in terminal S put of NAND Gate N1 goes LOW when the OPD is manually reset to its null. (See Manual Reset line of Table 1) Also, one input to NAND Gate 8 goes LOW causing its output to go HIGH. A HIGH at location 8 de-energizes the robot as described above. When the overload protection device is manually reset, next switch S1 may be put back into its "On" position. At this time, provided there is no overload and the overload protective device has been manually aligned and reset, the signals at all of the negative inputs to comparators 1, 2 or 3 will now be at a Low. The output of the comparators at logic point 2 will then revert to a High causing the output of NAND Gate 2 to go High and the output of NAND Gate 3 to go Low. When NAND Gate 3 goes Low, the pneumatic valve is de-energized causing the diaphragm to become rigid thereby non-compliantly coupling the robot tool to the arm through the overload protection device.

D1 goes OFF when logic point 2 goes HIGH during manual reset. S1 may then be set to the On position causing the grounds to be removed from the input to NAND Gate 2 and to NAND Gate 8 causing the voltage level at point 5 to go Low and points 7, 8 and 9 to go High, Low and High, respectively, thereby turning the green diode of D4 On and the red diode Off.

Also, with points 8 LOW and 9 HIGH, the robot may now be safely energized.

We claim:
1. An overload protector adapted to be secured between a robot arm and a tool, comprising:
   a cylinder having a central axis, an open end and a closed end,
   a floating piston located within the cylinder and having a central axis,
   a plurality of electromagnetic sensors for generating an electronic signal proportional to the strength of the sensed electromagnetic field secured to the cylinder and lying in a common plane normal to the cylinder axis and equally spaced, angularly, relative to the cylinder axis,
   a magnet for generating an electromagnetic field associated with each sensor, the magnets being secured to the piston in a common plane normal to the piston axis and equally spaced, angularly, relative to the piston axis,
   means for pressurizing the closed end of the cylinder to move the piston toward the open end,
   means to limit the movement of the piston toward the open end of the cylinder at a position where the common plane of the magnets and the common plane of the sensors are coincident, and
   means responsive to the electronic signals from the sensors for depressurizing the cylinder when the piston and cylinder are moved relative to each other and the piston moves toward the closed end of the cylinder and the common plane of the magnets and the common plane sensors are moved out of coincidence and the resultant relative movement between at least one magnet and its associated sensor cause a signal to be generated by at least one of the sensors to deviate substantially from a predetermined value.

2. An overload protector adapted to be secured between a robot arm and a tool, comprising:
   a cylinder having a central axis, an open end and a closed end,
   a floating piston located within the cylinder and having a central axis,
   a plurality of electromagnetic sensors for generating an electric signal proportional to the strength of the sensed electromagnetic field secured to the cylinder equally spaced, angularly, relative to the cylinder axis,
   a magnet associated with each sensor, the magnets being secured to the piston equally spaced, angularly, relative to the piston axis,
   means for pressurizing the closed end of the cylinder to move the piston toward the open end,
   guide means on the piston extending parallel to the piston axis,
   releasable detent means extending from the cylinder to the guide means on the piston to align each magnet angularly with its associated sensor and
   means responsive to the electronic signals from the sensors for depressurizing the cylinder when the piston and the cylinder are rotated relative to each other by a force sufficient to displace the detent means relative to the guide means and the resultant relative movement between at least one magnet and its associated sensor causes a signal to be generated by the sensor.

3. An overload protector adapted to be secured between a robot arm and a tool, comprising:
   a cylinder having a central axis, an open end and a closed end,
   a floating piston located within the cylinder and having a central axis,
   a plurality of electromagnetic sensors for generating an electronic signal proportional to the strength of the sensed electromagnetic field secured to the cylinder and lying in a common plane normal to the cylinder axis and equally spaced, angularly, relative to the cylinder axis,
   a magnet associated with each sensor, the magnets being secured to the piston in a common plane normal to the piston axis and equally spaced, angularly, relative to the piston axis,
   means for pressurizing the closed end of the cylinder to move the piston toward the open end,
   means to align the axis of the piston in coincidence with the axis of the cylinder and to position the common plane of the magnets in coincidence with the common plane of the sensors when the cylinder is pressurized, and
   means responsive to the electronic signals from the sensors for depressurizing the cylinder when the piston and the cylinder are displaced relative to each other and the axis of the piston and the axis of the cylinder are displaced out of coincidence and the resultant relative movement between at least one magnet and its associated sensor causes a signal to be generated by the sensor.

4. An overload protection device according to claim 1 wherein the means to limit the movement of the piston comprises conical mating surfaces on the piston and/or the cylinder adjacent the open end.

5. An overload protection device according to claim 2 wherein the releasable detent means is adjustable to vary the force with which it engages the guide means.

6. An overload protection device according to claim 2 wherein the guide means comprises V-shaped grooves in the piston.

7. An overload protection device according to claim 3 wherein the means to align the axis of the piston in coincidence with the axis of the cylinder, comprises angularly spaced projections and indentations on the piston and the cylinder.

8. An overload protection device according to claim 1 wherein a diaphragm separates the piston from the closed end of the cylinder.

9. An overload protection device according to claim 2 wherein a diaphragm separates the piston from the closed end of the cylinder.

10. An overload protection device according to claim 3 wherein a diaphragm separates the piston from the closed end of the cylinder.

11. Apparatus responsive to an overload signal indicative of excessive relative movement between a driving member and a driven member coupled together by an overload protection device in which said overload signal is generated and wherein such excessive relative movement derives from an overload condition, said apparatus comprising:
   a comparator circuit for comparing said overload signal to a reference level signal and generating a first pulse of a first polarity if said overload signal deviates from said level by a predetermined margin;
   overload indicator means responsive to said first pulse for generating a first signal indicative of said overload condition;
   valve means responsive to said first pulse for providing compliant coupling between said members;
   timer means responsive to said first pulse for generating a timing signal of known duration;
   de-energizing means responsive to said timing signal for de-energizing the driver of said driving member for the duration of said timing signal;
   a status indicator means responsive to said first pulse for indicating that said overload protection device is ready or is not ready to be operated;
   a switch means for de-energizing said valve means and re-energizing said driving member; and
   a reset signal for indicating when the overload condition has been corrected and said overload protection device has been reset.

12. The apparatus of claim 11 wherein the driving member comprises a robotic arm and the driven member comprises a tool.

13. The apparatus of claim 12 wherein the overload protection device comprises:
   a cylinder having a central axis, an open end and a closed end,
   a floating piston located within the cylinder and having a central axis,
   a diaphragm separating the piston from the closed end of the cylinder thereby providing compliant coupling between the piston and cylinder where the cylinder is not pressurized, a plurality of electromagnetic sensors for generating said overload signal, said signal being proportional to the strength of the sensed electromagnetic field, said sensors being secured to the cylinder and lying in a common plane normal to the cylinder axis and equally spaced, angularly, relative to the cylinder axis, a magnet associated with each sensor, the magnets being secured to the piston in a common plane normal to the piston axis and equally spaced, angularly, relative to the piston axis, means for pressurizing the closed end of the cylinder to move the piston toward the open end, and means to align the axis of the piston in coincidence with the axis of the cylinder and to position the common plane of the magnets in coincidence with the common plane of the sensors when the cylinder is pressurized.

14. The apparatus of claim 11 wherein the overload signal is generated by Hall effect sensors mounted in said overload protection device on a cylinder adjacent magnets mounted on a piston wherein the piston and cylinder form a chamber separated by a diaphragm.

15. The apparatus of claim 14 wherein the valve means provides compliance coupling by depressurizing the chamber.

16. The apparatus of claim 11 wherein the overload signal is an electronic signal, the first signal and reset signals are optical signals, and the switch means is manually operable.

17. The apparatus of claim 16 wherein the first signal and reset signal are generated by light emitting diode means capable of emitting red or green light and wherein the red light corresponds to the first signal while the green light corresponds to the reset signal.

18. The apparatus of claim 13 including means for preventing said valve means from being de-energized and said driving member energized unless the overload protection device has been aligned and nulled such that the overload signal from said sensors is below a predetermined level.

* * * * *